United States Patent [19]

Heilman

[11] Patent Number: 5,386,163
[45] Date of Patent: Jan. 31, 1995

[54] COUNTERWEIGHTED ROTOR
[75] Inventor: Raymond D. Heilman, St. Louis, Mo.
[73] Assignee: Emerson Electric Co., St. Louis, Mo.
[21] Appl. No.: 1,322
[22] Filed: Jan. 7, 1993
[51] Int. Cl.6 ............................................. H02K 1/22
[52] U.S. Cl. ........................................ 310/51; 310/42; 310/261; 73/468; 74/573 R
[58] Field of Search ........................ 310/51, 42, 74, 81, 310/261; 73/468, 487, 462, 460; 74/573 R

[56] References Cited

U.S. PATENT DOCUMENTS

| | | | |
|---|---|---|---|
| 295,215 | 3/1884 | Whitney | 310/74 |
| 2,089,626 | 8/1937 | Smith | 230/139 |
| 2,558,737 | 7/1951 | Darnell | 171/206 |
| 3,154,705 | 10/1964 | Essenburg | 310/51 |
| 3,157,805 | 11/1964 | Hoffmeyer et al. | 310/61 |
| 3,262,000 | 7/1966 | Rediger et al. | 310/261 |
| 3,965,382 | 6/1976 | McCrosky et al. | 310/261 |
| 4,388,756 | 6/1983 | Burns | 29/598 |
| 4,625,609 | 12/1986 | Ashworth | 83/748 |
| 4,642,886 | 2/1987 | Muck et al. | 9/598 |
| 4,893,044 | 1/1990 | Bosh et al. | 310/261 |
| 5,128,576 | 7/1992 | Obradovic | 310/217 |

Primary Examiner—R. Skudy
Assistant Examiner—D. R. Haszko
Attorney, Agent, or Firm—Polster, Lieder, Woodruff & Lucchesi

[57] ABSTRACT

A counterweighted rotor for use in a compressor assembly, the counterweighted rotor including a core assembly, an end ring defining a first end of the rotor, an end ring defining a second end of the rotor, each end ring having a plurality of coining lugs integrally cast thereto, the coining lugs sized for securing weights to the rotor, a plurality of counterweights for balancing the rotor, each of the counterweights including a body formed from powdered metal, the body having an aperture on its radial edge for engaging a coining lug, and a lip integrally formed on the counterweight porprotioned for contour fitting with the inside diameter of the rotor end ring. A method of forming counterbalanced rotor employs forming weights from powdered metal, the counterweights attaching to the rotor by coining over a coining lug of the rotor end ring through an aperature in the counterweight body.

7 Claims, 1 Drawing Sheet 5,386,163

COUNTERWEIGHTED ROTOR

BACKGROUND OF THE INVENTION

The present invention relates to dynamoelectric machines and more particularly, to motors having counterbalanced rotors used to balance customer compressors. The invention provides for a method of forming weights that attach to a rotor to offset the weight of customer or application components. While the invention is described in particular detail with respect to its use in compression assemblies, those skilled in the art will recognize the wider applicability of the invention disclosed hereinafter.

Counterbalanced rotors are old in the art. Rotors are balanced to offset the inertial load produced from attaching customer or application components to the motor with which the rotor is associated. An imbalance in such an assembly causes excessive vibration and vibration induced noises. A properly balanced rotor minimizes these vibrational effects. Weights are secured to the rotor to counterbalance the components. Several attempts have been made to form weights for counterbalancing rotors. The counterbalancing weights are often formed from stamped steel. The shapes produced by using stamped steel weights are limited to flat sections. The material is too rigid to produce shapes with intricate features. As a result, weight manipulation of stamp steel is difficult when minute alterations are required. The weight is manipulated by adding holes or grooves to the weights. This process includes drilling and sometimes filling holes in the weights, which is cumbersome and time consuming. Another method of forming counterbalanced rotors is by adding die-cast weights to the rotor. The weights are die-cast from metals including zinc and bronze. This method also limits weight manipulation of the rotor by drilling and filling holes in the weights. In addition, die-casting precludes incorporation of intricate features on the weights that provide for anti-rotation and shear resistance between the weights and the rotor.

SUMMARY OF THE INVENTION

It is therefore an object of this invention to provide a method of forming a counterbalanced rotor that affords precise weight manipulation or control.

Another object of this invention is to provide a method of forming a counterbalanced rotor that allows for size and shape variation of the counterbalancing weights.

Yet another object of this invention is to provide a counterbalanced rotor that allows a contoured fit between the weights and the rotor.

Still another object of this invention is to provide a counterbalanced rotor that minimizes vibration and vibration noises.

Another object of this invention is to provide a method of forming a counterbalanced rotor that is inexpensive and simple.

Another object of this invention is to provide counterbalancing weights that prevent anti-rotation and improve shear-resistance between the weights and the rotor.

Other objects will become apparent to those skilled in the art in light of the following description and accompanying drawings.

In accordance with this invention, generally stated, in combination a counterweighted rotor for use in an electric motor, the rotor including a core formed from a plurality of laminations, and an end ring defining a first end of the rotor, and an end ring defining a second end of the rotor. Each end ring has a plurality of coining lugs integrally cast therewith, the coining lugs sized for securing weights to the rotor, and a plurality of weights attached to the counterweighted rotor for reducing vibration and vibration induced noises in the rotor, each of the weights including a body formed from powdered metal, the body having an aperture found on the radial edge for engaging at least one of the coining lugs. Respective lugs fit through the body apertures and are coined over to secure the weight to the rotor. The weight includes a lip integrally formed with a main weight, proportioned for contour fitting with the inside diameter of the rotor end ring. A method of forming counterbalanced rotors with weights from powdered metal also is disclosed. The method provides for precise weight manipulation in rotor construction, thereby affording accurate counterbalance control of the rotor and its intended application. The method also provides for the incorporation of special features in the counterweight, including a counterweight with a body having an aperture sized to engage a coining lug, and a lip formed on the body to contour fit the weight on the end ring, the lip improving shear resistance and anti-rotation between the weight and the rotor.

It is to be understood that various changes may be made by one skilled in the counterbalanced rotor art to one or more of the features of the apparatus disclosed herein without departing from the scope or spirit of the present invention.

BRIEF DESCRIPTION OF THE DRAWINGS

Referring to the drawings which disclose one advantageous embodiment of the present invention.

DESCRIPTION OF THE PREFERRED EMBODIMENT

Figure 1:
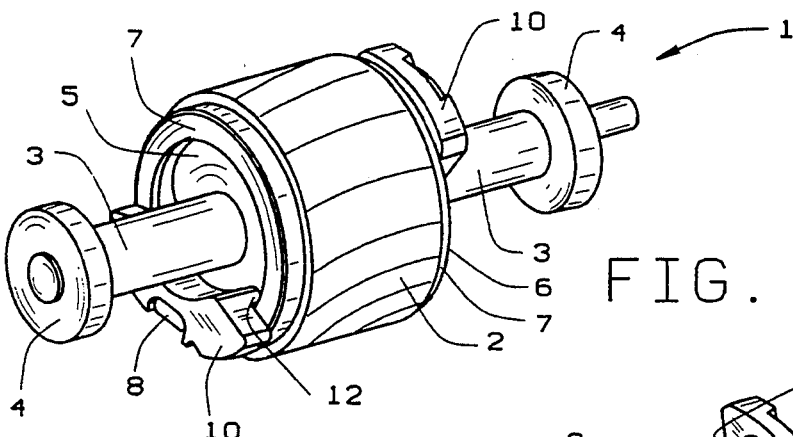
FIG. 1 is a view in perspective of one illustrative embodiment of a counterweighted rotor.
Figure 2:
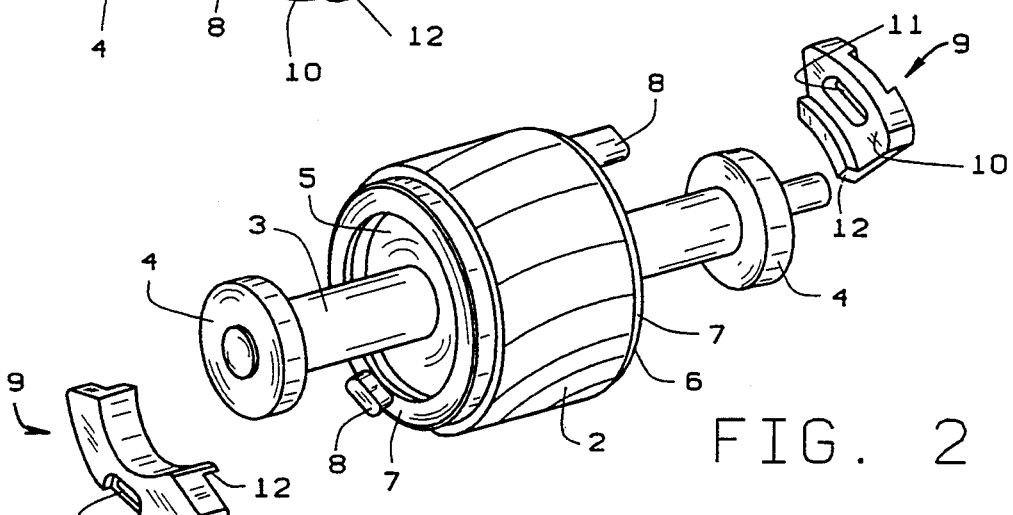
FIG. 2 is an exploded view in perspective of the counterweighted rotor.

Referring now to the drawings, and in particular to FIGS. 1 and 2, for one illustrative embodiment of counterbalanced rotor of this invention, reference numeral 1 indicates a completed rotor assembly ready for use in an associated stator assembly, not shown, of a dynamoelectric machine. Details of the dynamoelectric machine may be obtained from co-pending application Ser. No. 08/001,587, filed Jan. 7, 1993, assigned to the assignee of the present invention, the disclosure of which is intended to be incorporated by reference herein.

Figure 3:
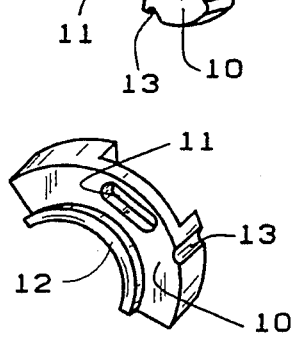
FIG. 3 is a front view in perspective of a weight for attachment to the component end of a counterweighted rotor.
Figure 4:
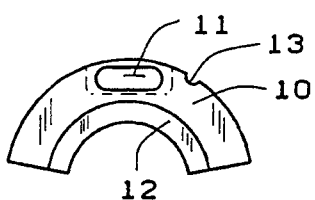
FIG. 4 is a front view in elevation of a weight for attachment to the component end of a counterweighted rotor.
Figure 5:
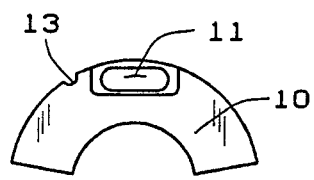
FIG. 5 is a back view in elevation of a weight for attachment to the component end of a counterweighted rotor.
Figure 6:
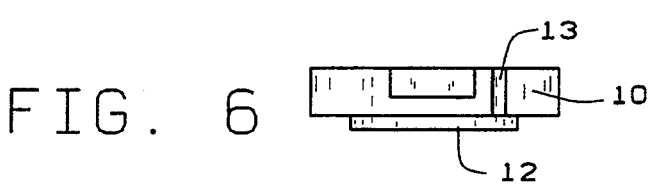
FIG. 6 is a side elevation of a weight for attachment to the component end of counterweighted rotor.
Figure 7:
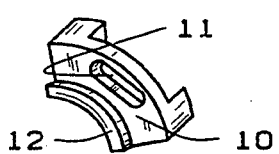
FIG. 7 is a front view in perspective of a weight for attachment to the motor end of the counterweighted rotor.
Figure 8:
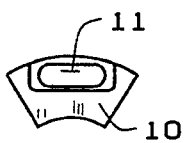
FIG. 8 is a back view in elevation of a weight for attachment to the motor end of the counterweighted rotor.
Figure 9:
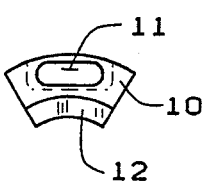
FIG. 9 is a front view in elevation of a weight for attachment to the motor end of the counterweighted rotor.
Figure 10:
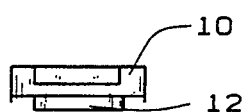
FIG. 10 is a side view in elevation of a weight for attachment to the motor end of the counterweighted rotor.

The counterbalanced rotor 1 includes a core 2 constructed from a plurality of laminations constructed from suitable magnetic material. Conventional electrical grade steel works well, for example. Rotor 2, as a core assembly, is of a conventional squirrel cage design, and is not described in detail. Rotor 2 is mounted on an axially extending shaft 3. Shaft 3 has an external eccentrically positioned bearing 4 associated with it. Rotor 2 has a first end 5 and a second end 6. Each end of rotor 2 is defined by an end ring 7. The end ring 7 includes at least one coining lug 8 integrally cast therewith. A plurality of weights 9 are attached to the rotor 2 for counterbalancing the rotor 2 to minimize vibration and vibration noises in the dynamoelectric machine. Weights 9 each include a body 10 having an aperture 11 sized to engage coining lug 8. Coining lugs 8 are proportioned to fit through apertures 11 in weights 9. The lugs 8 are coined over weights 9 to secure weights to the rotor. Weights 9 are made of powdered metal which allows for precise weight manipulation. The powdered metal permits production of several sizes and shapes of weights and also provides for the incorporation of intricate features on the weights. In one embodiment, the weight 9 includes a lip 12, best seen in FIGS. 3 and 7.

Lip 12 is integrally formed with weight body 10, and proportioned to contour fit with the inside diameter of end ring 7. Lip 12 improves shear resistance and anti-rotation between weight 9 and coining lug 8 on end ring 7.

Referring now to FIGS. 3–10, one embodiment of counterbalancing weights includes a larger weight, shown in FIGS. 3–6, and a smaller weight, shown in FIGS. 7–10. The larger weight attaches to the rotor 2 at the first end 5, and the smaller weight at second end 6 of rotor 2. The larger weight includes a groove 13 for identification in manufacturing. Groove 13 distinguishes the larger weight from the smaller weight to insure proper weight placement on end 5.

Numerous variations within the scope of the appended claims, will be apparent to those skilled in the art in light of the preceding description and accompanying drawings. Merely by way of example, the design configuration of the weights may vary in other embodiments of our invention. Likewise, the design configuration of the counterbalanced rotor 1 may be altered, depending on the intended application of the rotor. These variations are merely illustrative.

I claim:

1. A counterweight for use with a counterweighted rotor in an electric motor, the rotor including a pair of end rings, at least one end ring having a coining lug integrally cast with said rotor, each end ring having an inside diameter and an outside diameter, said counterweight comprising:
    a generally arcuate body portion having a first end and a second end, said body having an aperture formed along the radial edge and positioned to engage the coining lug integrally east on the rotor end ring, said body aperture being formed intermediate of said first and second ends of said body;
    said body including an outwardly extending lip integrally formed therewith, said lip being contoured to conform to the inside diameter of said rotor end ring.

2. The counterweight of claim 1 wherein said body is defined by an external arc, the external arc having a dimension corresponding to an arc of the outside diameter of the rotor.

3. The counterweight of claim 1 wherein said contoured lip engages said end ring to prevent anti-rotation and improve shear resistance in said counterweighted rotor.

4. In combination:
    A) a counterweighted rotor for use in an electric motor, said rotor including a core, an end ring defining a first end of said core, an end ring defining a second end of said core, each end ring having a plurality of coining lugs integrally east therewith, said coining lugs sized for securing weights to said rotor, and
    B) a plurality of weights attached to the rotor for reducing vibration and vibration induced noise in the counterweighted rotor, each of said weights including a generally arcuate body formed from powdered metal and defining a first end and a second end, said body having an aperture intermediate said body first and second ends and found on the radial edge to engage said coining lugs, a lip abutting from said body, said lip being adapted and designed to fit the contour of the inside diameter of said rotor end rings.

5. The combination of claim 4 wherein said coining lugs connecting to the body of said weights through the apertures of said body, said coining lugs coining over said body.

6. The counterweight of claim 2 wherein said counterweight body has an top surface, a bottom surface, an outer surface, and an inner surface; said counterweight including a groove extending inwardly from said counterweight outer surface to define an area of said counterweight having a reduced thickness, said aperture being formed in said groove, said lip extending from said body inner surface.

7. The counterweight of claim 6 wherein said groove is formed in said counterweight top surface.

* * * * *

UNITED STATES PATENT AND TRADEMARK OFFICE
CERTIFICATE OF CORRECTION

PATENT NO. : 5,386,163
DATED : January 31, 1995
INVENTOR(S) : Raymond D. Heilman It is certified that error appears in the above-indentified patent and that said Letters Patent is hereby corrected as shown below:

Col 4, Line 33, delete "east" and insert therefor ---cast---;

Signed and Sealed this

Fifth Day of August, 1997

Attest:

Attesting Officer

BRUCE LEHMAN
Commissioner of Patents and Trademarks